(12) United States Patent
Gauthier et al.

(10) Patent No.: US 7,690,184 B2
(45) Date of Patent: Apr. 6, 2010

(54) METHOD FOR TREATING OIL WASTE IN A GAS TURBINE ENGINE

(75) Inventors: Gerard Philippe Gauthier, Champagne sur Seine (FR); Jean-Pierre Mourlan, Nogent sur Marne (FR)

(73) Assignee: SNECMA, Paris (FR)

( * ) Notice: Subject to any disclaimer, the term of this patent is extended or adjusted under 35 U.S.C. 154(b) by 23 days.

(21) Appl. No.: 11/774,336

(22) Filed: Jul. 6, 2007

(65) Prior Publication Data

US 2008/0173002 A1 Jul. 24, 2008

(30) Foreign Application Priority Data

Jul. 7, 2006 (FR) .................................. 06 52860

(51) Int. Cl.
*F02C 7/06* (2006.01)

(52) U.S. Cl. ....................... 60/39.08; 60/772; 184/6.11

(58) Field of Classification Search ................ 60/39.08, 60/772; 184/6.11; 55/428, 401, 408, 409
See application file for complete search history.

(56) References Cited

U.S. PATENT DOCUMENTS

| 2,613,498 | A | * | 10/1952 | Prendergast | ................ 60/39.08 |
|---|---|---|---|---|---|
| 3,528,241 | A | | 9/1970 | Venable et al. | |
| 3,722,212 | A | * | 3/1973 | Stein | .......................... 60/39.08 |
| 4,511,016 | A | * | 4/1985 | Doell | .......................... 184/6.11 |
| 4,714,139 | A | * | 12/1987 | Lorenz et al. | ............... 184/6.11 |
| 4,755,103 | A | * | 7/1988 | Streifinger | ..................... 415/111 |
| 6,033,450 | A | * | 3/2000 | Krul et al. | ....................... 55/345 |
| 6,858,056 | B2 | * | 2/2005 | Kwan | ........................... 55/400 |
| 2002/0166317 | A1 | * | 11/2002 | Przytulski et al. | ........... 60/39.08 |
| 2002/0178729 | A1 | * | 12/2002 | Care et al. | ..................... 60/772 |
| 2005/0211093 | A1 | * | 9/2005 | Latulipe et al. | ................ 95/270 |
| 2005/0217272 | A1 | * | 10/2005 | Sheridan et al. | ............... 60/772 |

FOREIGN PATENT DOCUMENTS

| DE | 41 19 794 A1 | 12/1992 |
|---|---|---|
| GB | 306899 | 5/1930 |
| GB | 848864 | 9/1960 |
| GB | 1 293 811 | 10/1972 |
| GB | 2 374 026 A | 10/2002 |

* cited by examiner

*Primary Examiner*—Michael Cuff
*Assistant Examiner*—Phutthiwat Wongwian
(74) *Attorney, Agent, or Firm*—Oblon, Spivak, McClelland, Maier & Neustadt, L.L.P.

(57) ABSTRACT

A method for treating an airflow, laden with oil, flowing in a tube communicating with a rolling bearing enclosure of a gas turbine engine, wherein the airflow is made to travel into a coking box associated with a heating mechanism, in which the air is heated to a sufficient temperature to coke the oil particles contained in the airflow. Preferably, the solid residues produced by the coking are collected in the coking box.

8 Claims, 2 Drawing Sheets

METHOD FOR TREATING OIL WASTE IN A GAS TURBINE ENGINE

The present invention relates to the field of aviation gas turbine engines and is aimed more particularly at a method for treating bearing lubrication oil waste.

BACKGROUND OF THE INVENTION

A gas turbine engine consists basically of an air compression assembly that supplies a combustion chamber in which the air is mixed with a fuel to produce hot gases whose energy is recovered in a turbine assembly driving the compression means. The shafts connecting the various rotor bodies are supported in the statoric portions by bearings mounted in a pressurized enclosure. The enclosures make it possible to contain the oil that is injected onto the rolling bearings to ensure their lubrication and comprise sealing members, most frequently of the labyrinth type, that the containment air passes through. This air is laden with oil particles and in order to keep the oil consumption to as low a level as possible, it is a known practice to use deoiling equipment that separates the oil from the air that has flowed into the rolling bearing enclosures. In current engines, this equipment is incorporated either into the engine near the bearings themselves, or in the accessory gearbox, also called the AGB. The deoilers however are not 100% efficient. The exhausted air after it has passed through the deoilers still contains oil residues in the form of droplets that are ejected into the atmosphere. They are therefore the source of pollution and harm the environment.

The applicant has set itself the objective of reducing the polluting effect of the oil waste in the atmosphere.

According to the invention, the applicant has perfected a method for treating an airflow, laden with oil particles, flowing in a tube in communication with a rolling bearing enclosure of a gas turbine engine, wherein said airflow is made to travel into a coking box associated with a heating means, in which the air is heated to a sufficient temperature to coke the oil particles that it contains. Preferably, the solid residues produced by the coking are collected in the coking box.

Therefore the transformation by coking of the oil into gaseous and solid residues makes it possible to reduce the toxicity of the gases ejected into the atmosphere. On the one hand the coking makes it possible to reduce the volume of the oil waste, on the other hand, the residues are less toxic in themselves.

DESCRIPTION OF THE PRIOR ART

Document GB 2 374 026 is known, according to which the flow is made to travel into a box in which the air is heated to a sufficient temperature to vaporize the oil particles contained in the airflow. However, the oil particles are heated for the purpose of making the emissions in the atmosphere invisible and not to reduce their toxicity. There is no chemical transformation of the coking.

SUMMARY OF THE INVENTION

According to one embodiment of the method, the box is attached to said tube so that the air travels from the tube into the box. More particularly, in a gas turbine engine comprising an exhaust cone downstream of the turbine, the box is placed in said cone so that it is heated by the gases in the exhaust cone.

According to a preferred embodiment, the air is heated to a sufficient temperature to pyrolize the oil particles particularly by taking hot gases immediately downstream of the turbine.

A coking box for the treatment of an airflow containing oil particles flowing in a tube communicating with a rolling bearing enclosure of a gas turbine engine comprises a cylindrical casing with an opening on one side to receive the airflow from the tube and means forming chicanes. Preferably the box comprises a means for collecting the coked oil and more particularly the casing comprises an attachment means at the end of the central ventilation tube of the engine and an internal grid through which the oil particles are sprayed onto the internal wall of the casing and forming a means for collecting the coked oil.

The invention also relates to a gas turbine engine comprising a central ventilation tube and a gas exhaust cone, said tube opening into the exhaust channel, wherein the coking box is mounted on the central tube so as to be heated by the engine gases from the exhaust channel.

Preferably, said coking box is heated by gases taken downstream of the turbine at a sufficient temperature to pyrolize the oil particles. For example, the coking box is placed on the central ventilation tube close to a gas offtake connection immediately downstream of the turbine where the temperature is of the order of 500° C. This solution is of value because it leads to the elimination of any solid residue. In this case, it is therefore no longer necessary to intervene repeatedly on the coking box.

According to another embodiment for a gas turbine engine comprising an AGB with gears driving accessories, said box is mounted on said AGB.

BRIEF DESCRIPTION OF THE DRAWINGS

An embodiment of the invention will now be described in greater detail with reference to the drawings in which.

DESCRIPTION OF THE PREFERRED EMBODIMENTS

Figure 1:
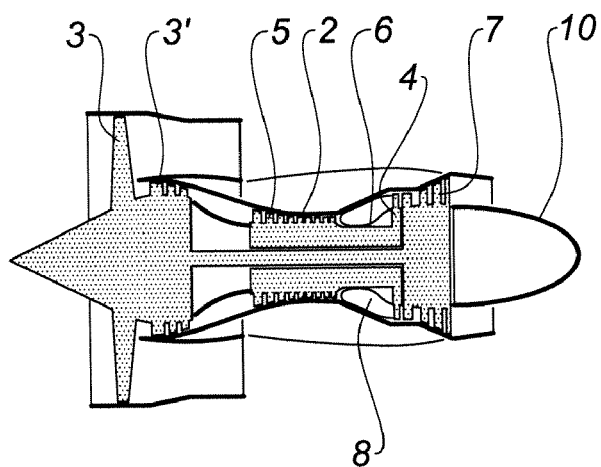
FIG. 1 represents a gas turbine engine to which the invention applies.

The gas turbine engine of FIG. 1 is a turbojet with a turbofan. Such an engine comprises, in this example, a high-pressure body with an HP compressor 2 driven by an HP turbine 4 both mounted on one and the same shaft 6. A shaft 5 concentric with the shaft 6 connects an upstream fan 3, associated with a low-pressure LP compressor 3', to a low-pressure LP turbine 7 downstream of the HP turbine 4. The air compressed by the compressors 3' then 2 travels into an annular combustion chamber 8 where it is mixed with the fuel to produce combustion gases. The latter are guided toward the HP turbine 4 then the LP turbine 7 and finally exhausted via the downstream nozzle comprising an exhaust cone. The propulsion force is supplied mostly for this type of engine by the airflow bypassing the combustion chamber and exhausted either directly into the atmosphere via an annular nozzle or mixed with the gases originating from the turbine and forming the main exhaust flow. The shafts are supported by intershaft bearings for the concentric rotating portions and by bearings mounted on the fixed, statoric, structures for the shaft 5.

Because of the temperatures, the bearings are lubricated and cooled permanently by oil that is contained in an enclosure called the rolling bearing enclosure. Pressurized air is injected at the seals to form a barrier and prevent oil from traveling toward the hot portions of the engine and causing a fire. After it has traveled into the deoiler for oil collection, the containment air is usually exhausted to the atmosphere via the central ventilation tube 9. This is the case when the deoilers are placed near the bearing enclosures. In the rest of the description, the invention applies to this case, but it is also valid for the case where the deoilers are placed on the AGB.

The air channeled via the tube 9 is exhausted downstream via a central duct placed in the frustoconical or substantially frustoconical part 10, defining the internal surface of the stream of gases originating from the turbine stages. This is called the exhaust cone. In the solutions of the prior art, the residual oil, even in a small quantity, is sent into the atmosphere through the exhaust cone.

According to the invention, all the residual oil in the air is removed, before the latter is exhausted into the atmosphere, by trapping it and oxidizing it to transform it into gaseous species and into coke with a lower toxicity than oil.

Figure 2:
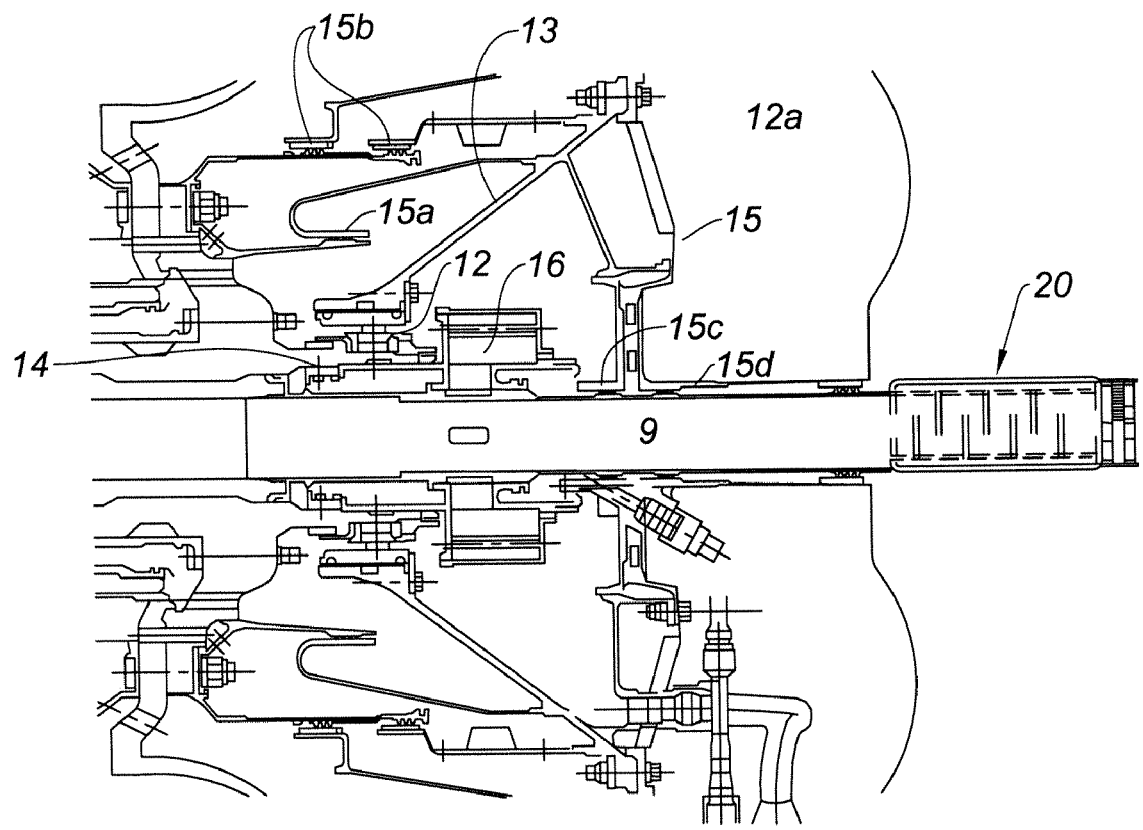
FIG. 2 shows the rear portion of an engine with a central ventilation tube fitted with a coking box of the invention.

One way of achieving this is illustrated in FIG. 2 which shows in greater detail the rear portion of an engine like that of FIG. 1. The rear bearing 12 supporting the trunnion 14 of the LP turbine can be seen. The rolling bearings 12a of the bearing 12 are mounted in a cage placed between the fixed bearing support 13 and the trunnion 14. The assembly is contained in an enclosure 15. Labyrinth seals 15a, 15b are arranged between the fixed structure of the enclosure and the LP rotor disk. Labyrinth seals 15c and 15d are also arranged between the fixed structure and the central ventilation tube that is fixedly attached to the LP shaft. The air of the enclosure is taken by the deoiler 16 and then is discharged centrally via the tube 9. The elements that have just been described do not form part of the invention and are known per se.

The air of the tube 9 is driven downstream inside the exhaust cone and is then mixed with the engine gases.

Figure 3:
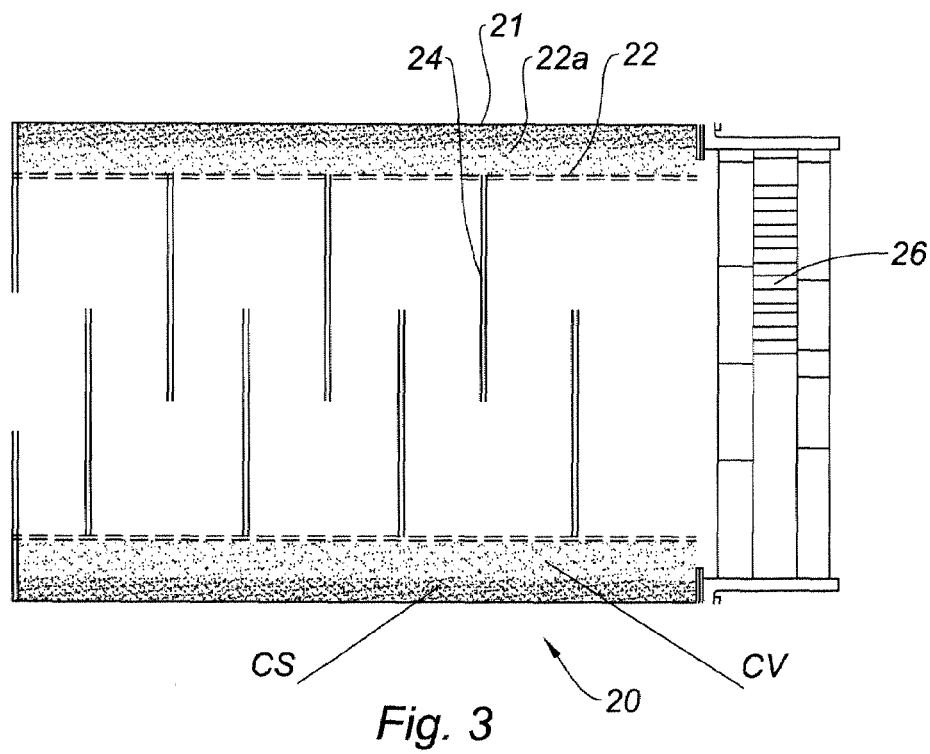
FIG. 3 shows in greater detail a coking box according to the invention.

According to the invention, a box, which will hereafter be called the coking box 20, has been placed on the downstream end of the central ventilation tube 9. This box is shown in detail in FIG. 3.

It comprises a cylindrical casing 21 of slightly greater diameter than that of the tube 9. The casing is attached at the end of the tube by any appropriate removable means. It is mounted so as to be open onto the tube. Inside the casing a cylindrical grid 22 makes an annular space 22a with the casing. Over the length of the casing 21, regularly spaced transverse plates 24 are attached in the volume delimited by the grid 22, in an alternating manner in the form of chicanes. The casing is closed downstream by a grid with axial holes and defining a flame-arrester 26. The casing 21 is therefore mounted downstream of the tube 9 so as to collect therefrom the air that passes through it. This air is forced into the casing by the plates 24 in a path alternately radially outward and radially inward. It follows that the oil particles that it contains are centrifuged through the grid 22. They are collected in the annular space 22a. By being placed at the end of the tube 9, the casing is heated by the ambient gases inside the exhaust cone which thereby, when the engine is operating, keep the wall of the casing 21 at a temperature of approximately 300° C. At this temperature, the oil in the space 22a sustains a thermal oxidation transformation. It is transformed partly into coked oil in the vapor phase CV and partly into coke CS, solid residue.

A means of eliminating the solid residue is to remove the box and change it. It is an operation that is carried out easily on the ground during the maintenance operations of the engine beneath the aircraft wing. According to an embodiment that is more economically advantageous, the box may be made in the form of a removable and replaceable cartridge. However, it must be recognized that, in certain turbojet operating conditions or in the case of a fault (excessive oil consumption), the quantity of coke formed may not be negligible. This means either relatively frequent or unscheduled interventions, harming profitability, or an increase in the volume of the box resulting in a space requirement and a weight that is just as harmful.

Figure 4:
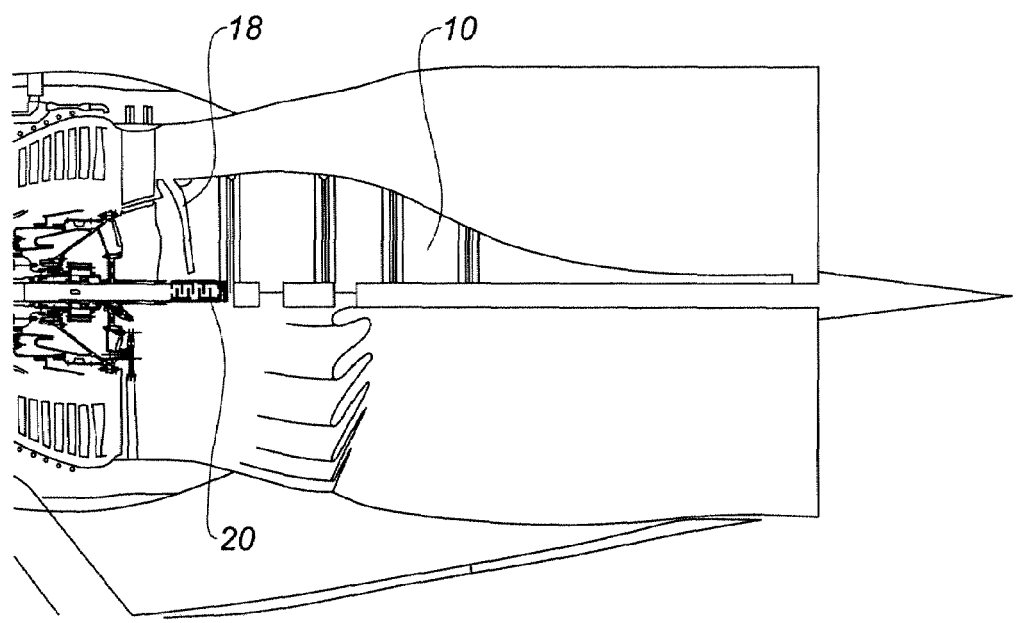
FIG. 4 shows a means for heating the coking box according to the invention.

An advantageous means of eliminating the solid residue more rapidly is to pyrolize it as it forms by taking it to high temperature. Specifically, above 500° C., the coke is burnt without leaving any residue. Therefore, according to a particular embodiment, the device comprises a means of heating the box to 500° C. FIG. 4 shows an installation of the box inside the exhaust cone as in the previous case but adding a tube 18 to bring a determined quantity of gas from the stream of the main flow to the walls of the box.

The invention claimed is:

1. A method for treating an airflow, laden with oil, flowing in a tube communicating with a rolling bearing enclosure of a gas turbine engine, said method comprising:
   inputting said airflow into a coking box;
   forcing said airflow inside said coking box by transverse plates inside said coking box so as to follow a path alternatively radially outward and radially inward;
   heating the airflow inside the coking box to a sufficient temperature so as to coke the oil contained in the airflow such that the oil of the airflow sustains a thermal oxidation transformation inside said coking box and is transformed partly into vapor and partly into a solid residue.

2. The method as claimed in claim 1, further comprising collecting in the coking box the solid residue produced by the coking.

3. The method as claimed in claim 1, wherein said coking box is attached to said tube so that the airflow travels from the tube into the box.

4. The method as claimed in claim 3 for treating said airflow in a gas turbine engine comprising an exhaust cone downstream of a turbine, wherein the coking box is placed in said exhaust cone so that said coking box is heated by the gases in the exhaust cone.

5. The method as claimed in claim 1, wherein the airflow is heated to a sufficient temperature to pyrolize the solid residue thereby eliminating said solid residue from said coking box.

6. The method as claimed in claim 5, wherein the airflow is heated by taking hot gases immediately downstream of a turbine.

7. The method as claimed in claim 1, wherein said coking box has a cylindrical casing with a longitudinal axis, and wherein said method comprises positioning said cylindrical casing such that said longitudinal axis of said cylindrical casing is aligned with a longitudinal axis of said gas turbine engine.

8. The method as claimed in claim 1, further comprising centrifuging said oil through a grid inside said coking box and collecting said oil into a space between said grid and a casing of said coking box.

\* \* \* \* \*